(12) United States Patent
Houston et al.

(10) Patent No.: US 6,746,632 B2
(45) Date of Patent: Jun. 8, 2004

(54) MORPHOLOGY TRAPPING AND MATERIALS SUITABLE FOR USE THEREWITH

(75) Inventors: Michael R. Houston, Berkeley, CA (US); Toshiaki Hino, Berkeley, CA (US); David S. Soane, Piedmont, CA (US)

(73) Assignee: ZMS, LLC, Emeryville, CA (US)

( * ) Notice: Subject to any disclaimer, the term of this patent is extended or adjusted under 35 U.S.C. 154(b) by 0 days.

(21) Appl. No.: 10/190,208

(22) Filed: Jul. 5, 2002

(65) Prior Publication Data

US 2002/0190408 A1 Dec. 19, 2002

Related U.S. Application Data

(63) Continuation of application No. 09/592,873, filed on Jun. 13, 2000, now Pat. No. 6,419,858.

(51) Int. Cl.[7] .............................. B29D 11/00; C08F 2/48
(52) U.S. Cl. ...................... 264/1.32; 428/412; 428/480; 428/492; 428/500; 428/411.1; 522/116; 522/113; 522/119; 522/114; 522/120; 522/121; 264/1.1; 264/1.32; 264/27; 264/22; 264/175; 264/299; 264/319; 427/508; 525/903
(58) Field of Search .............................. 264/1.1, 1.32, 264/27, 22, 157, 299, 319; 522/116, 113, 119, 114, 120, 121; 428/411.1, 412, 480, 492, 500; 525/903; 427/508

(56) References Cited

U.S. PATENT DOCUMENTS

| | | | |
|---|---|---|---|
| 4,180,447 A | * | 12/1979 | Sencar ....................... 521/50.5 |
| 4,187,159 A | * | 2/1980 | Goswami et al. .......... 521/50.5 |
| 4,402,887 A | | 9/1983 | Kuriyama et al. |
| 4,430,417 A | | 2/1984 | Heinz et al. |
| 4,510,593 A | | 4/1985 | Daniels |
| 4,524,162 A | | 6/1985 | Domeier |
| 4,785,064 A | | 11/1988 | Hegel |
| 5,110,514 A | | 5/1992 | Soane |
| 5,114,632 A | | 5/1992 | Soane |
| 5,278,243 A | | 1/1994 | Soane |
| 5,449,703 A | | 9/1995 | Mitra et al. |
| 5,747,553 A | | 5/1998 | Guzauskas |
| 6,380,314 B1 | * | 4/2002 | Soane et al. ................. 525/242 |
| 6,416,690 B1 | * | 7/2002 | Soane et al. ................. 264/1.7 |
| 6,570,714 B2 | * | 5/2003 | Soane et al. ................. 359/646 |

FOREIGN PATENT DOCUMENTS

| | | |
|---|---|---|
| EP | 0106641 | 4/1984 |
| EP | 0238863 | 9/1987 |
| EP | 0490448 | 6/1992 |
| GB | 498679 | 1/1939 |
| GB | 577432 | 5/1946 |
| GB | 2257978 A | 1/1993 |
| WO | WO 00/17675 | 3/2000 |
| WO | WO 00/0055653 A1 | 9/2000 |

* cited by examiner

*Primary Examiner*—James J. Seidleck
*Assistant Examiner*—Sanza L McClendon
(74) *Attorney, Agent, or Firm*—M. Henry Heines; Townsend and Townsend and Crew LLP; Jaqueline S. Larson

(57) ABSTRACT

This invention is directed to a process for the rapid in-situ curing of polymerizable materials to provide macromolecular networks and articles of manufacture that are "morphology-trapped"; that is, they exhibit a fixed phase morphology and/or molecular orientation that is locked in by the curing step. The process includes the steps of mixing together a dead polymer, a reactive plasticizer and an initiator to give a polymerizable composition; further processing the mixture in order to achieve a desired phase morphology and/or molecular orientation of the polymeric constituents; shaping the polymerizable composition into a desired geometry; and exposing the polymerizable composition to a source of polymerizing energy, without mixing, to give a final product with the desired phase morphology and/or molecular orientation locked in place. The phase morphology and molecular orientation present just prior to cure of the polymerizable composition is subsequently trapped or locked in place by the curing step so that further changes in morphology are hindered or prevented.

55 Claims, No Drawings

MORPHOLOGY TRAPPING AND MATERIALS SUITABLE FOR USE THEREWITH

This application is a continuation application of application Ser. No. 09/592,873, filed Jun. 13, 2000, now U.S. Pat. No. 6,419,858, the disclosure of which is incorporated herein by reference in its entirety.

FIELD OF THE INVENTION

This invention is related to the fields of polymerization, polymer phase morphology, and molding. More particularly, it is related to a process for locking in the morphological structure of single-phase or multi-phase polymeric systems. This process enables the production of objects that possess a resistance to further changes in their phase morphology in later processing steps or during use.

BACKGROUND OF THE INVENTION

Phase-separated systems are ubiquitous in the polymer world, primarily because few polymer blends are truly compatible. Fortunately, multi-phase morphologies have proven useful in polymer systems more often than not. One reason is that phase-separated materials provide a higher performance through synergism, as evidenced by multi-phase systems exhibiting important properties such as: impact resistance, toughness, high temperature performance, high modulus, tensile strength, lower expansion coefficients, dimensional stability, high strength-to-weight ratio for plastics, improved elasticity or damping for elastomers, flammability resistance, elongation, gloss, and/ or better adhesion. Polymer blends may also enable one to achieve desired physical properties such as melt viscosity, higher or lower softening point, easier processability, and solvent resistance. Finally, the use of polymer mixtures or blends may be simply dictated by economics, using dilution of a more expensive material by a cheaper material for reduced cost.

The benefits of polymer blends are not without their drawbacks, however. For instance, some desirable phase morphologies may be difficult to achieve, requiring high processing temperatures or intensive mixing. Other morphologies, once attained, may be sensitive to external stimuli, being easily destroyed or altered by induced stress, high-temperature excursions or exposure to solvents. For example, certain material systems containing one or more polymers exhibit Critical Solution Temperature (CST) phase transitions during processing, whereby the system phase separates upon crossing a phase boundary. When phase separation is seen upon heating, the system exhibits a Lower Critical Solution Temperature (LCST). When phase separation is seen upon cooling, the system exhibits an Upper Critical Solution Temperature (UCST). The temperature at which the LCST or UCST transition takes place depends on the composition of the system, as well as other physical conditions such as pressure, pH, etc. Such phase transitions, however, dramatically alter the phase morphology of a given polymer blend and are often undesirable. An optically clear polymer blend that turns cloudy upon cooling due to a phase separation is one example of a material system that exhibits an unstable phase morphology.

Polymer morphology may also be important in single-component or homogeneous multi-component systems when the molecular-level orientation of polymer chains produces either a desired, or unwanted, effect. One such case is seen in polycarbonate systems that undergo "solvent induced" crazing when exposed to various solvents. The crazing event is characterized by a chain re-orientation process (microcrystallization in this case) that leads to a brittle and/or opaque material and is therefore undesirable. Alternatively, molecular level orientation is sometimes beneficial, such as in drawn polymer films or fibers in which the obtained molecular orientation provides for improved properties such as tensile strength or puncture or tear resistance. Additionally, oriented films find use in optical applications due to their inherent optical anisotropy. Oriented films and fibers are often attained by stretching at elevated temperatures, which in and of itself is a time- and energy-consuming process. In addition, the molecular level orientation achieved by such techniques is susceptible to chain re-randomization upon later exposure to high temperatures, leading to recoil, shrinkage, and degradation of properties. Thus, it would be desirable to have material systems that possess a resistance to such morphology-altering crazing and/or re-randomization processes upon being exposed to adverse environments.

Whether during processing or in-use, adverse conditions often lead to the undesirable alteration or destruction of a given material morphology. The problems associated with the instability of the morphologies present in polymeric systems, either in part or in whole, are subsequently addressed by the invention disclosed herein.

SUMMARY OF THE INVENTION

The present invention is directed to a method for manipulating and controlling the phase-separation behavior, morphology, and molecular orientation in a wide variety of materials containing at least one polymeric component. It can be an extremely economical process suitable for mass manufacture. The invention is further directed to the formulation of a new class of polymeric materials that exhibit trapping of the phase morphology or molecular level orientation, resulting in stabilization of the optimized engineering properties of the final object. A unique feature of this invention is that the phase morphology and molecular orientation present just prior to cure of a polymerizable composition is subsequently trapped or locked in place by a curing step so that further changes in morphology are hindered or prevented. Such morphology trapping may be directed to macrophase-, microphase-, and nanophase-separated systems, or to systems that are homogeneous down to the molecular level. The resulting polymeric materials may comprise one or more polymeric components, and said polymeric molecules may be randomly coiled or oriented with respect to each other. Single-phase, binary-phase, and multi-phase systems all fall within the scope of this invention.

More particularly, this invention is directed to a process for the rapid in-situ polymerization of materials to provide polymeric macromolecular networks and articles of manufacture that are "morphology-trapped"; that is, they exhibit a fixed phase morphology and/or molecular orientation that is locked in by the polymerization step. The process includes the steps of mixing together a dead polymer, a reactive plasticizer and an initiator to give a polymerizable composition; further processing the mixture in order to achieve a desired phase morphology and/or molecular orientation of the polymeric constituents; shaping the polymerizable composition into a desired geometry; and exposing the polymerizable composition to a source of polymerizing energy, without mixing, to give a final product with dimensional stability and the desired phase morphology and/or molecular orientation locked in place. In a presently preferred embodiment, the polymerizable composition is a semi-solid.

In this method, both the desired material morphology (phase morphology as well as molecular orientation) and the desired overall shape or configuration of the part are set prior to material cure. The morphology-trapped article so produced can optionally be transparent and/or have resistance to impact (resilient). The resulting morphology-trapped macromolecular network is characterized as having either i) a semi-interpenetrating crosslinked polymer network of reactive plasticizer wrapped around and within an entangled dead polymer (semi-IPN); ii) an interpenetrating crosslinked polymer network of reactive plasticizer within an entangled dead polymer, the reactive plasticizer polymer network being further crosslinked to the dead polymer; or iii) interpenetrating reactive plasticizer polymer chains (uncrosslinked), which may be linear, branched, etc., within an entangled dead polymer. Thus, curing of the polymerizable composition leads to a final composite polymeric material in which the phase morphology and/or molecular orientation present just prior to the initiation of curing is preserved by the formation of the reactive plasticizer polymeric chains and/or network. Such phase morphology trapping is made possible in accordance with the present invention by physically or chemically locking in the molecular structure of the material during the curing step.

This approach is particularly powerful if the curing kinetics are fast. More particularly, the reactive plasticizer may promote mixing and compatibilization of two polymers (homopolymers or copolymers), in which case the reactive plasticizer also acts as a compatibilizer. While in the pseudocompatible state that results, the system is quickly cured and/or crosslinked to freeze the partial compatibility in place. In this way, a morphological state that could not otherwise be achieved (i.e., without the use of the reactive compatibilizer) can now be obtained and preserved.

The morphology trapping process disclosed herein is distinctly different from the manufacturing process for systems, such as for example high-impact polystyrene (HIPS), in which the desired morphology evolves as polymerization proceeds. In the HIPS manufacturing process, polybutadiene particles (typically lightly crosslinked) are added to an excess of styrene monomer. As the styrene monomers polymerize in the presence of the polybutadiene, very specific morphologies evolve, often depending on the type and degree of mixing to which the system is subjected. The morphology trapping process of the present invention is distinctly different from processes like HIPS manufacturing and others because the morphology to be trapped exists immediately prior to cure, with no mixing during the final curing step.

The invention disclosed herein encompasses the processing steps and methods by which morphology-trapped materials may be produced, as well as the materials so produced. It further encompasses certain polymerizable compositions useful with the process, as well as the resultant cured materials with a locked-in morphology. The compositions may optionally include other additives well known in the art to provide certain desirable characteristics, such as to effect mold release, improved stability or weatherability, non-yellowing properties, and the like. This invention permits a broad selection of reaction chemistries to achieve final parts with a desired morphology based on phase-separation behavior and/or the geometric orientation of the individual molecules within the material. The resultant engineered materials and processes can be used to manufacture products that have superlative mechanical, thermal, or optical properties, or that have other desirable but previously difficult-to-achieve characteristics.

DETAILED DESCRIPTION OF THE INVENTION

The terms "a" and "an", as used herein and in the appended claims mean "one or more".

The term "morphology" as used herein and in the appended claims refers to the morphological state of the polymeric constituents relative to any other ingredients in a given material system. This may include homopolymer systems, polymer blends (when polymers are mixed with other polymers), polymer networks (when polymer chains are crosslinked to one another), as well as polymer composite materials (when polymers are mixed with other non-polymeric materials). In polymeric blends or composites in which more than one polymeric constituent is present, the polymers often exhibit phase separation, as evidenced by the presence of at least two distinct phase domains. In this context, the morphology of the polymeric constituents may be specified according to the presence, size, shape, and density of one or more of the polymeric phases within a given material system. Examples include the presence of spherical or cylindrical occlusions within a continuous phase, interpenetrating bi-continuous cylinders, or alternating lamellae of the two phases. Many other configurations exist, such as phase-within-a-phase-within-a-phase or interfacial-type arrangements that can be particularly important for imparting certain desirable mechanical and optical properties to a given material, such as impact strength for example. The morphology of polymeric systems as applied to multi-component systems is well described in the literature. See, for example, the text *Polymeric Multicomponent Materials* by L. H. Sperling (John Wiley & Sons, Inc., 1997), which is incorporated herein by reference.

The orientation of one or more of the polymeric constituents at the molecular level also falls within the scope of the term "morphology". For example, polymeric chains may be oriented longitudinally with respect to each other by stretching (i.e., films or fibers) or by operations involving high shear (e.g., injection molding), or the chains may be oriented biaxially by operations such as blow molding. Such orientations can be extremely important for achieving the desired mechanical properties for a given application. The morphology of a polymeric material may be orientated as well. In this case, morphological features such as cylinders or lamellae are induced to orient with respect to each other and/or an external surface of the part (such as by stretching or flowing in a mold for instance). Morphological orientation can also be extremely important for achieving the desired mechanical (and sometimes optical) properties for a phase-separated material.

The term "morphology" further includes the physical arrangement of a polymeric material at an interface or in forming an interface. In particular, the arrangement and orientation of polymeric constituents at an interface between two polymeric phases or between a polymeric phase and a non-polymeric phase (e.g., additives such as filler particles, fibers, or platelets) are particularly important for determining the mechanical properties of the resulting composite material. Other interfaces of interest are not necessarily solid-solid, but rather may be solid-liquid or solid-gaseous interfaces, such as those present in a material exhibiting porosity. The size, shape, orientation, and configuration of the pores within a polymeric material are widely recognized to play an important role in the barrier or permeability properties of the material (e.g., its ability to act as a filter), as well as its mechanical properties. Such interfacial configurations and/or porosity characteristics are thus encompassed by the term morphology herein.

The terms "trapped" or "locked in" as used herein and in the appended claims refer to the stabilization of the morphology beyond that otherwise seen in a comparable pure, untreated polymeric system. The stabilization effect may be in response to one or more adverse effects, such as high or low temperature excursions, unfavorable chemical environments, external stresses or loadings, or any other condition that may induce a change in the system morphology.

The term "dead polymer" as used herein and in the appended claims refers to a fully polymerized, generally non-reactive polymer. When certain polymer chemistries are used, the dead polymer may react with a reactive plasticizer once curing is initiated, even if the dead polymer does not have unsaturated or otherwise reactive entities within or attached to the chain. Or the dead polymer may intentionally possess some level or degree of unsaturation within the polymer chain. The dead polymer may be linear or branched, homopolymer or copolymer. In the case of a copolymer, the sequence distribution may be random in sequence or blocky. The block copolymers may be tapered, or may have grafted side chains. The architecture of the dead polymer may further be branched, multi-chain, comb-shaped or star-shaped. Di-block, tri-block or multi-block structures all fall within the scope of this invention. For many material systems, the relevant properties are achieved by producing a mixture of two or more polymers or copolymers, all of which shall be termed dead polymers for the purpose of this disclosure.

The polymerizable composition useful in the production of morphology-trapped polymeric materials in accordance with this disclosure is prepared by mixing the dead polymer with at least one small-molecule species, which is itself polymerizable or crosslinkable due to the presence of one or more reactive entities within the small molecule. This small-molecule species is referred to herein and in the appended claims as a "reactive plasticizer". The reactive plasticizer may encompass monomers, crosslinkers, oligomeric reactants, oligomeric crosslinkers, or macromeric reactants or macromeric crosslinkers (collectively macromers). The reactive plasticizer plasticizes the dead polymer to give a mixture having a desired composition, which should be nominally homogeneous upon mixing, notwithstanding the multi-phase morphologies common to multicomponent polymeric systems. The mixture may be further heated or cooled to a desired temperature (i.e., the processing temperature) to effect a desired material morphology or to impart a desired malleability or deformability to the material for optional molding or coating steps. The processing temperature can be chosen conveniently to be moderately above or below ambient temperature such that cycle times are minimized. The mixture may also be subsequently or concurrently compressed, squeezed, stretched, or otherwise manipulated under whatever processing conditions necessary to effect a desired material morphology prior to cure. Casting from solvent solutions is another useful method for achieving desirable material morphologies that may be otherwise difficult to obtain. In all such cases, however, the desired degree of mixing and the resultant morphology exist before proceeding to the final curing step.

The reactive plasticizers can be mixtures themselves, composed of mono-functional, bi-functional, tri-functional or other multi-functional entities. For example, incorporating a mixture of monofunctional and multi-functional reactive plasticizers will, upon polymerization, lead to a reactive plasticizer polymer network in which the reactive plasticizer polymer chains are crosslinked to each other (i.e., a semi-IPN). During polymerization, the growing reactive plasticizer polymer chains may also graft to or react with the dead polymer, creating a type of IPN, even if no unsaturated or other apparently reactive entities are present within the dead polymer chains. Thus, the dead polymer chains may act as crosslinking entities during cure, resulting in the formation of a crosslinked reactive plasticizer polymer network even when only monofunctional reactive plasticizers are present in the mixture. Grafting to or crosslinking across the dead polymer chains is generally not detrimental to the final composite material resulting from the practice of the present invention, but rather may in fact enhance the phase morphology and/or molecular orientation trapping behavior inherent to this disclosure.

In total, the amount and composition of the reactive plasticizer (which itself may comprise a mixture of monomers and crosslinkers with various degrees of functionality) in the resulting formulation is such that the cured composite polymeric material exhibits a morphology which is locked in or trapped by the formation of the reactive plasticizer polymer chains. That is, the reactive plasticizer is present in a concentration sufficient to preserve or stabilize the morphology existing just prior to cure. Morphology preservation will generally be effected by physically limiting the rearrangement of the polymeric constituents in the cured composite material (either kinetically or chemically or both) such that the desired morphology shall remain nominally constant over time periods (and conditions such as temperature and pressure) of interest. While not wishing to be bound by theory, it is believed that said physical limitations on the movement of the polymeric constituents result from: i) the formation of an adjacent or surrounding reactive plasticizer network which slows or physically inhibits the movement of nearby polymer molecules (kinetic trapping) due to physical barriers to diffusion or reptation; ii) the chemical crosslinking and/or grafting of reactive plasticizer chains to dead polymer chains during the curing reaction such that the subsequent movement of polymer molecules is inhibited by said crosslinks (chemical trapping); iii) a combination of i) and ii); or iv) the creation of interfaces where on either side of the interface the material is partially crosslinked. The amount of reactive plasticizer used to achieve said morphology or molecular orientation trapping is generally about 0.1% to about 90% by weight, preferably from about 1% to about 50%, more preferably from about 5% to about 30%.

The type of reactive plasticizers used may be chosen beneficially in order to enhance the morphology-trapping effect by, for example, choosing reactive plasticizers which form thermally stable, rigid polymeric chains (i.e., polymers with relatively high glass transition temperatures). Such chains will tend to be unyielding, thus physically limiting any movement or rearrangement of the dead polymer(s). The reactive plasticizers may be further chosen to include reactive entities that are capable of grafting to or reacting with the dead polymer such that full crosslinking occurs upon cure. It should also be recognized that certain types of reactive plasticizers may preferentially migrate to one dead polymer phase versus another. In general terms, the concept of "like-dissolves-like" applies in such a dead polymer-reactive plasticizer system, so it can be expected that reactive plasticizers will tend to concentrate in dead polymer phases having similar chemical structures. The types and amounts of reactive plasticizers needed to achieve a locked-in morphology upon curing can be determined without undue experimentation, however. The breadth and variety of reactive plasticizers available for the practice of this invention should be recognized as an underlying strength of this invention, as will be discussed further below.

Polymerization initiators are added to the mixture to trigger polymerization upon exposure to a source of polymerizing energy such as light, heat, ionic beams, microwaves, x-rays, e-beams, or gamma radiation. In addition, condensation, ring-opening and other polymerization mechanisms may be similarly practiced by the addition of suitable monomeric precursors and initiators. Such initiators are well-known in the art. Optionally, other additives may be included such as mold release agents, non-reactive conventional plasticizers or flexibilizers, pigments, dyes, organic or inorganic fibrous or particulate reinforcing or extending fillers, thixotropic agents, indicators, inhibitors or stabilizers (weathering or non-yellowing agents), UV absorbers, surfactants, flow aids, chain transfer agents, foaming agents, porosity modifiers, and the like. The initiator and other optional additives may be dissolved or dispersed in the reactive plasticizer component prior to combining with the dead polymer to facilitate complete dissolution into and uniform mixing with the dead polymer. Alternatively, the initiator and other optional additives may be added to the mixture at any time, including just prior to polymerization, which may be preferred when thermal initiators are used for example.

The ingredients in the polymerizing mixture can be blended by hand or by mechanical mixing. The ingredients may preferably be warmed slightly to soften or liquefy the dead polymer component. Any suitable mixing device may be used to mechanically homogenize the mixture, such as blenders, kneaders, internal mixers, compounders, extruders, mills, in-line mixers, static mixers, and the like, optionally blended at temperatures above ambient temperature, or optionally blended at pressures above or below atmospheric pressure.

In one presently preferred embodiment of the invention, an optional waiting period may be allowed during which the ingredients are not mechanically agitated. This optional waiting period may take place between the time the ingredients are initially metered into a holding container and the time at which they are homogenized mechanically or manually. Alternatively, the ingredients may be metered into a mixing device, said mixing device operated for a sufficient period to dry-blend the ingredients, then an optional waiting period may ensue before further mixing takes place. Or, the ingredients may be fully mixed in a mechanical device, after which time a waiting period ensues. The waiting period may extend for about an hour to one or more days. Such a waiting period is useful for achieving homogenization of a given polymer system down to very small length scales since mechanical mixing techniques do not usually achieve mixing at the length scale of microphase domains. Thus, a combination of both mechanical mixing and a waiting period may be used to achieve homogenization across all length scales. The waiting period duration and its order in the processing sequence may be chosen empirically and without undue experimentation as the period that gives the most efficient overall mixing process in terms of energy consumption, overall process economics, and final material properties.

This embodiment of the invention may be particularly beneficial when the polymerizable mixture contains a high fraction of the dead polymer ingredient, especially when the dead polymer is glassy or rigid at ambient temperatures. Utilization of a waiting period may also be particularly beneficial when the dead polymer is thermally sensitive and so cannot be processed at temperatures above its softening point over a certain time period without undue degradation. When attempting to blend two or more polymers, it may be useful to add the reactive plasticizer(s) to the component with the highest glass transition temperature first, allowing it to be plasticized. The other lower $T_g$ components may then be mixed in at a temperature lower than that which could have been used without the plasticizing effect of the reactive plasticizers, thus reducing the overall thermal exposure of the system. Alternatively, the reactive plasticizer(s) may be partitioned between the polymers to be mixed, plasticizing each of them separately. The independently plasticized polymers may then be mixed at a relatively low temperature, with correspondingly lower energy consumption and degradation of the polymers.

It should be noted that the techniques and protocols used to mix multiple polymers, as well as the dead polymer-reactive plasticizer-initiator mixture given by this invention, often influence the phase morphology and/or molecular orientation of the resulting material system. Since the phase morphology and molecular orientation can have a profound effect on the desired material properties, much consideration will usually be given to the mixing step in this process. In general, the processing techniques traditionally used to achieve a desired phase morphology and/or molecular orientation for pure polymer systems may likewise be used in the practice of the present invention (sometimes beneficially at a lower temperature and/or pressure) with substantially the same results, especially when the reactive plasticizer content is kept below about 30%. This and other beneficial aspects of the invention will be described further below.

Once the dead polymer(s), reactive plasticizer(s), and initiator(s) are combined, the mixture often provides a preferable composition that is semi-solid and non-flowable at room temperature, such that it may be easily handled as a discrete part or object without undue stickiness or deformation, yet is pliant and malleable. As a result, when said preferable mixture is placed between two mold halves that are subsequently closed, it deforms into the desired geometry without undue resistance, especially if slight heating is applied such that the mixture is warmed to slightly above ambient temperature. Where compressing, stretching, or otherwise working or shaping the composite material is used to achieve a desired phase morphology, molecular orientation, or morphological orientation, such processes may likewise be facilitated by the pliant, deformable consistency achievable by plasticizing the dead polymer with the reactive plasticizer and optionally heating or cooling the mixture.

The pliant, deformable mixtures described above are desirable because they allow for less resistance to molding, shaping, or molecular orienting operations. Alternatively, the operations may be carried out at lower temperatures than is otherwise used for comparable operations performed on polymer systems alone not containing any plasticizing components. In either case, the presence of the reactive plasticizer may allow for better annealing of the deformed material as compared to pure polymeric systems, reducing stress concentration points and birefringence in the resulting object. Another benefit is that such compositions may be handled and stored at room temperature, while molding or shaping into the desired geometry may occur at temperatures only slightly or moderately removed from ambient. The types and relative amounts of reactive plasticizer and dead polymer will dictate the time- and temperature-dependent visco-elastic properties of the mixture. It should be recognized that the visco-elastic properties of the chosen compositions may be wide and varied. Since virtually all known material systems become more compliant upon heating (in the absence of chemical reactions), the molding temperature will usually, but not necessarily, be equal to or higher than the handling temperature.

When a desired molecular or morphological orientation is to be achieved and locked into place in accordance with the practice of this invention, the plasticizing effect of the reactive plasticizer will prove to be especially beneficial for polymers that are glassy at room temperature in their pure state. Ordinarily, such polymers must be heated to about their glass transition temperature or above before any orientation operation is performed, such as flowing or stretching for example. With the presence of at least a small amount of reactive plasticizer, however, the glass transition temperature of the polymer is effectively lowered, allowing such orientation operations to be carried out at correspondingly lower temperatures. Yet, once polymerization commences, the plasticizing effect of the reactive plasticizers may be eliminated (when forming a polymer having a similar $T_g$ as the dead polymer), giving a composite material with similar or improved properties compared to the pure dead polymer system in a state of molecular alignment. The ability to process at a lower temperature prior to cure has the benefit of reducing cycle times and energy consumption, thereby making such processes more economical. Additionally, thermal degradation of temperature-sensitive polymers is reduced, as are the inherent hazards associated with higher temperature processes.

In the practice of this invention, it is the intention of the authors that both the desired material morphology (phase morphology as well as molecular and/or morphological orientation) and the desired overall shape or configuration of the part be set prior to material cure. The ability to lock in both a precise shape and material morphology in a single curing step should be appreciated by those skilled in the art of polymer processing and molding. While it is possible to further shape the cured part by mechanical grinding, cutting, polishing or other such operations, such subsequent processing falls outside of the scope of this invention.

Upon triggering the curing reaction by exposing the processed dead polymer-reactive plasticizer-initiator mixture to a source of polymerizing energy, the reactive plasticizers form polymeric chains consisting mostly of the monomeric species present in the mixture, often with some degree of grafting or crosslinking to the dead polymer chains. Polymerization proceeds among the monomeric species (even when the polymerizing energy source is turned off) until the reactive sites are quenched or until all of the monomer is effectively reacted into the growing polymeric chains. Note that the "monomeric" species can be either monofunctional or polyfunctional (thus serving the role of chain extenders or crosslinkers). The monomeric species may also be relatively large in molecular weight, reaching those commonly associated with oligomers. The length and intensity of the exposure to the source of polymerizing energy will vary depending on the types and amounts of monomeric species and initiators used (as well as the type of polymerizing energy source used). By way of example, the curing duration may often last minutes to days for parts that are thermally cured by heating slightly above ambient. Alternatively, when free-radical or cationic curing mechanisms are used and triggered by a high-intensity UV light source, the curing duration may last from a few seconds to a few minutes.

In addition to beneficially reducing cycle duration, fast reaction times (i.e., rapid curing) can also be important for quickly locking in a desired morphology, especially if the desired morphology does not represent an equilibrium state or is sensitive to small changes in conditions. For the purposes of this disclosure, "rapid curing" or "rapid reaction" times shall refer to curing cycles in which 95% or more of the monomer is cured in less than an hour. More preferably, 99% of the monomer is cured in less than 10 minutes. Morphologies that do represent equilibrium states can be cured more slowly without such concerns, although faster cycle times are usually preferred from an economic standpoint.

It should be noted that relatively low shrinkages and only modest temperature rises are typically observed during the curing operation of the present invention as compared to the curing of pure monomeric systems. This is because the percentage of monomeric species in the overall mixture is less than 90%, or preferably less than 50%, or more preferably less than 30%. Thus, while a pure monomeric casting operation may experience shrinkage as high as about 15% and a temperature spike of about 200° C., when only 30% of such monomeric species are incorporated into the preferred mixtures of this invention the shrinkage decreases to less than about 5% and the temperature rise is moderated to under about 70° C. The amount of shrinkage and the temperature rise upon curing decrease even further when less than 30% reactive plasticizer is used in the mixture. For example, a realistic formulation may contain only about 10 wt % of reactive plasticizer. Upon curing the mixture, one observes a shrinkage of less than about 2% and a temperature rise of about 20° C. Such low shrinkages and thermal spikes are quite manageable for the production of dimensionally precise objects, which find multitudes of uses throughout industry.

When curing is complete, the final part or object has the benefit of possessing a fixed or locked-in phase morphology, molecular orientation and/or morphological orientation ("morphology-trapped"). That is, the system morphology exhibits a degree of stability beyond that otherwise seen in pure polymeric systems. For example, multi-component systems that normally exhibit a phase change upon heating or cooling (i.e., a UCST or an LCST) can have their phase state locked-in such that no phase change is seen at the expected transition temperature. Thus, systems that ordinarily phase separate or otherwise change their morphology upon exposure to an elevated temperature can be trapped in the desired state by practice of the present invention. In the materials so produced, phase separation and/or morphology changes are prevented during analogous temperature excursions. As another example, certain block copolymers exhibit a desired morphology (e.g., cylindrical rods dispersed in a continuous phase) upon being cast from a solvent solution, but change to an alternating lamellae or spherical-shaped occlusions upon being heated or cooled. By practice of this invention, the cylindrical rod configuration may be trapped in place such that subsequent heating or cooling does not destroy the desired morphology.

Another example would be a polymeric film that is stretched so as to orient the polymer molecules biaxially, a process useful for imparting puncture and tear resistance to the polymer films. However, when such films are heated to the extent that the polymer chains gain enough mobility to move with respect to one another, they typically reorient themselves to assume a random configuration, destroying the biaxial orientation used to achieve the desired impact and/or tear resistance. By incorporating reactive plasticizers into the film material, stretching the material to achieve molecular-level orientation, then curing the system to trap or lock-in the preferred molecular orientation, the film is made more resistant and in some cases impervious to degradation brought about by thermally-induced re-randomization of the polymer chain orientation during high-temperature exposures.

Analogously, block copolymers which exhibit alternating lamellae structures (or cylindrical rods for that matter) may be morphologically oriented by flowing the material biaxially. Squeezing the material between two mold halves is one example, where the lamellae are expected to organize roughly perpendicular to the direction of compression. In this case, too long of a period at the elevated temperature used for molding will allow the morphology to relax into a less oriented state, as will future high temperature exposures. However, when the reactive plasticizer is cured to lock-in the desired morphology orientation (biaxial in this example), such concerns are eliminated. Morphology trapping in accordance with this disclosure also eliminates the need for rapid cool-down procedures in which the part is quenched in order to preserve the existing desired morphology before relaxation takes place (a common result if cool down is too slow).

As yet another example, many materials undergo crazing or similar phase separation behavior in response to an applied stress or altered chemical environment. For instance, polycarbonate exhibits solvent-induced crazing when exposed to a common solvent such as acetone, which leads to a cloudy, non-transparent material. Such behavior can be mitigated, however, by mixing a dead polymer with a reactive plasticizer, then curing to lock in the molecular conformation of the chains (in this case, the amorphous configuration of the chains). When such a composite material is then exposed to the same solvents, no crazing or clouding of the material is observed, indicating the stabilization effect of the cured reactive plasticizer(s).

Finally, it should be pointed out that the desired morphology of certain materials is a manifestation of their porosity or internal void structure. Such is the case with materials that are foamed by inclusion of a blowing agent during processing or that are made porous by inclusion of a porosity modifier (usually an incompatible liquid agent that leaves behind a porous structure once the modifier is removed). In these materials, the size of the cells and/or pores, and their configuration (open cell or closed cell, connected or dead-end pores) drastically affect the final properties such as strength-to-weight ratio, permeability (diffusivity and solubility), adsorption and absorption, etc. Unfortunately, when such materials are exposed to adverse environmental conditions such as high temperatures or pressures, compatible or incompatible solvents, external stresses, etc., the cell or pore structure is subject to alteration and/or damage. Through the practice of the invention disclosed herein, however, the morphological features of a given material may be fixed, protecting the material against unwanted fluctuations in its pore or cell structure, for example. Such morphology trapping will be especially appreciated by those wishing to use current material systems under conditions (temperature, pressure, solvent exposure, etc.) beyond their current capabilities.

Innumerable examples exist of applications where it may be found desirable to trap or lock-in a given, desired morphology for stability during subsequent processing steps and/or during in-use conditions. Very often this situation is encountered when an undesirable phase or morphology change accompanies a required or unavoidable fluctuation in temperature or other environmental condition. The utility of the invention described herein is that morphology trapping may be effected both easily and economically by the incorporation of a reactive plasticizer component and an appropriate initiator, followed by a polymerization reaction at the conditions in which the desired morphology is present. Not only can the benefits of morphology trapping be realized in this simple manner, but the plasticizing effect of the reactive plasticizer component can be utilized to benefit the processing characteristics of the mixture (lower temperature processing, facile molding, etc.) prior to cure.

Material Design Considerations

Systems of interest to the present application contain one or more polymeric components (dead polymers). The polymeric component(s) may be linear, branched, or crosslinked. The polymer chains should be long enough such that a morphology or molecular orientation may be defined across some length scale, usually about ten "mers" (repeat units) or more. With respect to the physical arrangement of one or more phase domains, systems may exhibit distinct phase regions from as small as nano-scale dimensions (i.e., phase-separated domains on the order of about 1–100 nanometers) up to macroscopic phase regions as large as a few millimeters (millimeter-long fibers dispersed in a polymer matrix for example). In addition, material morphology with respect to molecular orientation focuses attention down to the Angstrom-sized length scale. Thus, included within the scope of this invention is any material system exhibiting a morphology of interest that is from about the millimeter length scale down to the Angstrom length scale, said material system comprising at least one polymeric component.

The simplest of such systems might be considered to be ordinary homopolymers, in which a reactive plasticizer and an initiator may be easily incorporated and reacted to effect a trapping of the molecular orientation of the dead polymer chains just prior to cure. In such cases, the reactive plasticizer is generally chosen to be compatible with the dead polymer of interest, at least at some desired processing conditions of temperature and pressure. "Compatibility" refers to the thermodynamic state where the reactive plasticizer solvates and/or plasticizes the dead polymer. In practice it has been found that molecular segments with structural similarity promote mutual dissolution. Hence, aromatic moieties on the polymer generally dissolve in aromatic plasticizers, and vice versa. Hydrophilicity and hydrophobicity are additional considerations in choosing the reactive plasticizers to mix with a given dead polymer. Compatibility may generally be assumed in systems that appear clear or transparent upon mixing, although for the purposes of this invention, compatibility is not required, but is merely preferred, especially when transparent objects are to be produced.

Even when only partial compatibility is observed at room temperature, the mixture often becomes uniform at a slightly increased temperature; i.e., many systems become clear at slightly elevated temperatures. Such temperatures may be slightly above ambient temperatures or may extend up to the vicinity of 100° C. or more. In such cases, the reactive components can be quickly cured at the elevated temperature to "lock-in" the compatible phase-state in the cured resin before system cool-down. Thus, phase-morphology trapping can be used to produce an optically clear material instead of a translucent or opaque material that would otherwise form upon cooling.

Since both material and processing approaches can be exploited to produce optically clear parts, this disclosure presents a powerful new technique for the production of transparent objects. Optically clear and morphologically stable parts have a wide range of potential applications. With the process innovation described herein, unique composite material systems can be developed for the production of transparent objects possessing heretofore unattainable or difficult-to-achieve properties. For example, optically transparent materials such as polycarbonate, polystyrene, polymethyl methacrylate, polysulfone, polyphenylene oxide, polyethylene terephthalate, amorphous polyolefins, thermoplastic elastomers, and variations, copolymers, and/or mixtures thereof can be employed to create useful formulations by mixing with suitable reactive plasticizer packages. Optically transparent phase-separated systems may be beneficial prepared by combining a phase-separated iso-refractive mixture as the dead polymers in the system. When a reactive plasticizer is added which either (1) partitions itself approximately equally between the phases or (2) has a refractive index upon polymerizing similar to that of the dead polymer mixture, a clear part results upon curing. Alternatively, when the reactive plasticizer does not partition itself equally between the phases and does not possess a refractive index upon curing similar to the polymer mixture, the refractive index of one of the phases may be altered to give a resultant iso-refractive mixture. Such manipulations may be advantageously carried out in accordance with the present invention in order to realize heretofore-unattainable properties (i.e., simultaneous mechanical, optical, and processing properties) for a given material system.

The production of optically clear materials not withstanding, virtually any thermoplastic may be used as the dead polymer for the production of morphology-trapped materials. By way of example, these may include: polystyrene, polymethylmethacrylate, poly(acrylonitrile-butadiene-styrene), polyvinyl chloride, polycarbonate, polysulfone, polyvinylpyrrolidone, polycaprolactone, and polyetherimide. The thermoplastics may optionally have small amounts of reactive entities attached (copolymerized, grafted, or otherwise incorporated) to the polymer backbone to promote crosslinking upon cure. They may be amorphous or crystalline. They may be classified as high performance engineering thermoplastics (e.g., polyether imides, polysulfones, polyether ketones, etc.), or they may be biodegradable, naturally occurring polymers (starch, prolamine, and cellulose, for example). They may be oligomeric or macromeric in nature. These examples are not meant to limit the scope of compositions possible during the practice of the current invention, but merely to illustrate the broad selection of thermoplastic chemistries permitted under the present disclosure.

Reactive plasticizers may be mixed with a thermoplastic polymer such as those listed above to give a semi-solid-like composition that can be easily molded into dimensionally precise objects. Upon polymerizing to form a cured resin, the phase morphology within the material just prior to cure is locked in to give a composite that exhibits an increased degree of morphology stability. Thermoplastic polymers may be chosen in order to give optical clarity, high index of refraction, low birefringence, exceptional impact resistance, thermal stability, UV transparency or blocking, tear or puncture resistance, desired levels or porosity, selective permeability to desired permeants (high oxygen permeability, for example), resistance to deformation, low cost, or a combination of these and/or other properties in the finished object.

Polymer blends achieved by physically mixing two or more polymers are often used to elicit desirable mechanical properties in a given material system. In practice, such blends may be mechanical, latex, or solvent-cast blends; graft-type blends (surface modification grafts, occasional grafts (IPNs, mechanochemical blends)), or block copolymers. Depending on the chemical structure, molecule size, and molecular architecture of the polymers, the blend may result in mixtures comprising both compatible and incompatible, amorphous or crystalline constituents.

Most polymer blends and block copolymers, and many other copolymers, result in phase-separated systems, providing an abundance of phase configurations to be exploited by the materials designer. The physical arrangement of the phase domains may be simple or complex, and may exhibit continuous, discrete/discontinuous, and/or bicontinuous morphologies. Some of these are illustrated by the following examples: spheres of phase I dispersed in phase II or vice versa; cylinders of phase I dispersed in phase II or vice versa; interconnected cylinders; ordered bicontinuous, double-diamond interconnected cylinders of phase I in phase II (as have been documented for star-shaped block copolymers); alternating lamellae (well-known for di-block copolymers of nearly equal chain length); rings forming nested spherical shells or spirals; phase within a phase within a phase (HIPS and ABS); and simultaneous multiples of these morphologies resulting from the thermodynamics of phase separation (both nucleation and growth as well as spinodal decomposition mechanisms), kinetics of phase separation, and methods of mixing, or combinations thereof. Such morphology configurations may be beneficially utilized in conjunction with the present invention because the invention disclosed herein does not replace the methods known in the art for producing such useful morphologies. Instead, this invention provides a means to lock in or trap the desired morphology in a given state once it has been achieved using conventional means. Once trapped, the material may be dried free of solvent, heated or cooled, stressed, mechanically cut, ground, or polished, or subjected to adverse chemical environments, all with the benefit of a stabilized morphology.

Another category of materials utilizes "thermoplastic elastomers" as the dead polymer. An exemplary thermoplastic elastomer is a tri-block copolymer of the general structure "A-B-A", where A is a thermoplastic rigid polymer (i.e., having a glass transition temperature above ambient) and B is an elastomeric (rubbery) polymer (glass transition temperature below ambient). In the pure state, ABA forms a microphase-separated or nanophase-separated morphology. This morphology consists of rigid glassy polymer regions (A) connected and surrounded by rubbery chains (B), or occlusions of the rubbery phase (B) surrounded by a glassy (A) continuous phase. Depending on the relative amounts of (A) and (B) in the polymer, the shape or configuration of the polymer chain (i.e., linear, branched, star-shaped, asymmetrical star-shaped, etc.), and the processing conditions used, alternating lamellae, semi-continuous rods, or other phase-domain structures may be observed in thermoplastic elastomer materials. Under certain compositional and processing conditions, the morphology is such that the relevant domain size is smaller than the wavelength of visible light. Hence, parts made of such ABA copolymers can be transparent or at worst translucent. Thermoplastic elastomers, without vulcanization, have rubber-like properties similar to those of conventional rubber vulcanizates, but flow as thermoplastics at temperatures above the glass transition point of the glassy polymer region. Commercially important thermoplastic elastomers are exemplified by SBS, SIS, and SEBS, where S is polystyrene and B is polybutadiene, I is polyisoprene, and EB is ethylenebutylene copolymer. Many other di-block or tri-block candidates are known, such as poly(aromatic amide)-siloxane, polyimide-siloxane, and polyurethanes. SBS and hydrogenated SBS (i.e., SEBS) are well-known products from Shell Chemicals (Kraton®). DuPont's Lycra® is also a block copolymer.

When thermoplastic elastomers are chosen as the starting dead polymer for formulation, exceptionally impact-resistant yet clear parts may be manufactured by mixing with reactive plasticizers. The thermoplastic elastomers, by themselves, are not chemically crosslinked and require relatively high-temperature processing steps for molding. Upon cooling, such temperature fluctuations lead to dimensionally unstable, shrunken or warped parts. The reactive plasticizers, if cured by themselves, may be chosen to form a relatively glassy, rigid network or a relatively soft, rubbery network, but with relatively high shrinkage in either case. When thermoplastic elastomers and reactive plasticizers are blended together and reacted to form a cured resin, however, they form composite networks with superior shock-absorbing and impact-resistant properties, while exhibiting relatively little shrinkage during cure. By "impact-resistant" is meant resistance to fracture or shattering upon being struck by an incident object. Depending on the nature of the dead polymer and reactive plasticizers used in the formulation, the final cured resin may be more flexible or less flexible (alternatively, harder or softer) than the starting dead polymer. Composite articles exhibiting exceptional toughness may be fabricated by using a thermoplastic elastomer which itself contains polymerizable groups along the polymer chain. A preferred composition in this regard would be SBS tri-block or star-shaped copolymers, for example, in which the reactive plasticizer is believed to crosslink lightly with the unsaturated groups in the butadiene segments of the SBS polymer.

A preferred formulation for developing optically clear and high impact-resistant materials uses styrene-rich SBS tri-block copolymers that contain up to about 75% styrene. These SBS copolymers are commercially available from Shell Chemicals (Kraton®), Phillips Chemical Company (K-Resin®), BASF (Styroluxo®), Fina Chemicals (Finaclear®), Asahi Chemical (Asaflex®), and others. In addition to high impact resistance and good optical clarity, such styrene-rich copolymers yield material systems which exhibit other sometimes desirable properties such as a relatively high refractive index (that is, an index of refraction equal to or greater than about 1.54) and/or low density (with 30% or less of a reactive plasticizer, their densities are less than about 1.2 g/cc, and more typically about 1.0 g/cc).

When the mixture refractive index is an especially important consideration, high refractive index polymers may be used as one or more of the dead-polymer components. Examples of such polymers include polycarbonates and halogenated and/or sulfonated polycarbonates, polystyrenes and halogenated andlor sulfonated polystyrenes, polystyrene-polybutadiene block copolymers and their hydrogenated, sulfonated, and/or halogenated versions (all of which may be linear, branched, star-shaped, or non-symmetrically branched or star-shaped, etc.), polystyrene-polyisoprene block copolymers and their hydrogenated, sulfonated and/or halogenated versions (including the linear, branched, star-shaped, and non-symmetrical branched and star-shaped variations, etc.), polyethylene or polybutylene terephthalates (or other variations thereof), poly(pentabromophenyl (meth)acrylate), polyvinyl carbazole, polyvinyl naphthalene, poly vinyl biphenyl, polynaphthyl (meth)acrylate, polyvinyl thiophene, polysulfones, polyphenylene sulfides or oxides, urea-, phenol-, or naphthyl-formaldehyde resins, polyvinyl phenol, chlorinated or brominated polystyrenes, poly(phenyl $\alpha$- or $\beta$-bromoacrylate), polyvinylidene chloride or bromide, and the like. In general, increasing the aromatic content, the halogen content (especially bromine), and/or the sulfur content are effective means well known in the art for increasing the refractive index of a material. High index, low density, and resistance to impact are properties especially preferred for ophthalmic lenses as they enable the production of ultra thin, lightweight eyeglass lenses, which are desirable for low-profile appearances and comfort and safety of the wearer.

Alternatively, elastomers, thermosets (e.g., epoxies, melamines, acrylated epoxies, acrylated urethanes, etc., in their uncured state), and other non-thermoplastic polymeric compositions may be desirably utilized during the practice of this invention.

As discussed previously, mixtures of such materials may also be beneficially used to create morphologically stable parts with desirable properties. For example, impact modifiers (usually lightly crosslinked particles or linear polymer chains) may be blended into various thermoplastics or thermoplastic elastomers to improve the impact strength of the final cured resin. In such cases, the presence of the reactive plasticizers may facilitate blending by lowering the softening temperature of the polymers to be blended. This is especially advantageous when temperature-sensitive materials are being blended with high-$T_g$ polymers. When optically clear materials are desired, the mixture components (i.e., the dead polymers, the impact modifiers, and/or the reactive plasticizers) may be chosen to produce the same refractive index between the phases (iso-refractive) such that light scattering is reduced. When iso-refractive components are not available, the reactive plasticizers may nonetheless act as compatibilizers to help reduce the domain size between two immiscible polymers to below the wavelength of light, thus producing an optically clear polymer mixture that would otherwise have been opaque. The presence of reactive plasticizers may also in some cases improve the adhesion between the impact modifier and the dead polymer, improving the resultant mixture properties.

The reactive plasticizers (diluents) can be used singly or in mixtures to facilitate dissolution of a given dead polymer. The reactive functional group may be acrylate, methacrylate, acrylic anhydride, acrylamide, vinyl, vinyl ether, vinyl ester, vinyl halide, vinyl silane, vinyl siloxane, (meth)acrylated silicones, vinyl heterocycles, diene, allyl and the like. Other less known but polymerizable functional groups can be employed, such as epoxies (with hardeners) and urethanes (reaction between isocyanates and alcohols). In principle, any monomers may be used as reactive plasticizers in accordance with the present invention, although preference is given to those which exist as liquids at ambient temperatures or slightly above, and which polymerize readily and rapidly with the application of a source of polymerizing energy such as light or heat in the presence of a suitable initiator.

Reactive monomers, oligomers, and crosslinkers that contain acrylate or methacrylate functional groups are well known and commercially available from Sartomer, Radcure and Henkel. Similarly, vinyl ethers are commercially available from Allied Signal. Radcure also supplies UV curable cycloaliphatic epoxy resins. Photo-initiators such as the Irgacure and Darocur series are well-known and commercially available from Ciba Geigy, as is the Esacure series from Sartomer. Thermal initiators such as azobisisobutyronitrile (AIBN), benzoyl peroxide, dicumyl peroxide, t-butyl hydroperoxide, and potassium persulfate are also well known and are available from chemical suppliers such as Aldrich. Vinyl, diene, and allyl compounds are available from a large number of chemical suppliers, as is benzophenone. For a reference on initiators, see, for example, Polymer Handbook, J. Brandrup, E. H. Immergut, eds., $3^{rd}$ Ed., Wiley, New York, 1989. Below we will use acrylates (and in a few cases, methacrylates) to illustrate the flexibility of our formulation approach. Similar structures with other reactive groups based on either small or large molecule architectures (such as acrylamides, vinyl ethers, vinyls, dienes, and the like) can be used in conjunction with the disclosed casting process.

To demonstrate the great diversity of reactive plasticizers that can be used to achieve such compatibility, we will name only a few from a list of hundreds to thousands of commercially available compounds. For example, mono-functional entities include, but are not limited to: butyl acrylate, octyl acrylate, isodecyl acrylate, hexadecyl acrylate, stearyl acrylate, isobornyl (meth)acrylate, vinyl benzoate, tetrahydrofurfuryl acrylate (or methacrylate), caprolactone acrylate, cyclohexyl (meth)acrylate, benzyl (meth)acrylate, ethylene glycol phenyl ether acrylate, methyl methacrylate, ethyl acrylate, and propyl acrylate, etc. Bi-functional entities include, but are not limited to: polyethyleneglycol diacrylate, polypropyleneglycol diacrylate, hexanediol diacrylate, Photomer 4200 (from Henkel), polybutadiene diacrylate (or dimethacrylate), Ebecryl 8402 (from Radcure), bisphenol A di(meth)acrylate, ethoxylated (or propoxylated) bisphenol A di(meth)acrylate, etc. Tri-functional and higher multi-functional entities include, but are not limited to: trimethylolpropane tri(meth)acrylate (and its ethoxylated or propoxylated derivatives), pentaerythritol tetraacrylate (and its ethoxylated or propoxylated derivatives), Photomer 6173 (a proprietary acrylated oligomer of multi functionality, from Henkel), and a whole host of aliphatic and aromatic acrylated oligomers and acrylated urethane-based oligomers from Sartomer (the SR series), Radcure (the Ebecryl series), and Henkel (the Photomer series).

When high refractive index materials are desired, the reactive plasticizers may be chosen accordingly to have high refractive indices. Examples of such reactive plasticizers, in addition to those mentioned above, include brominated or chlorinated phenyl (meth)acrylates (e.g., pentabromo methacrylate, tribromo acrylate, etc.), brominated or chlorinated naphthyl or biphenyl (meth)acrylates, brominated or chlorinated styrenes, tribromoneopentyl (meth)acrylate, vinyl naphthylene, vinyl biphenyl, vinyl phenol, vinyl carbazole, vinyl bromide or chloride, vinylidene bromide or chloride, bromoethyl (meth)acrylate, bromophenyl isocyanate, and the like. As stated previously, increasing the aromatic, sulfur and/or halogen content of the reactive plasticizers is a well-known technique for achieving high-refractive index properties.

In a presently preferred embodiment, reactive plasticizers containing acrylate, methacrylate, acrylamide, and/or vinyl ether moieties are found to give convenient, fast-curing UV-triggered systems.

The compatibility of dead polymer-reactive plasticizer mixtures is demonstrated by checking the optical transparency of the resulting material at room temperature or slightly above, as illustrated by Example 1 below.

EXAMPLES

Example 1

Experimental Protocol

Dead polymers are added to a vial pre-filled with a small quantity of the intended reactive plasticizer. Gentle heating is applied while stirring homogenizes the mixture. The resulting semi-solid-like mass is observed visually, and optical transparency at various temperatures is recorded. Complete clarity is indicative of component miscibility. A faint haze suggests partial miscibility, and opacity equates to incompatibility (light scattering as a result of phase separation). Many pairs of dead polymer-reactive plasticizers can thus be investigated.

Examples 2 and 3 report several findings of system compatibility and partial compatibility, following this procedure.

Example 2

Kraton-Based Systems

The following polymers are studied using the protocol described in Example 1. The accompanying table summarizes the polymer characteristics.

TABLE 1

| Kraton type | Composition (%) | Description |
|---|---|---|
| G 1652 | SEBS (S:29/EB:71) | linear, low molecular weight |
| G 1650 | SEBS (S:29/EB:71) | linear, medium Mw |
| G 1657 | SEBS (S:13/EB:87) | linear |
| D 1102 | SBS (S:28/B:72) | linear, low Mw |
| D 4141 | SBS (S:31/B:69) | linear |
| D 4240p | $(SB)_n$ (S:44/B:56) | branched |
| D 1116 | $(SB)_n$ (S:21/B:79) | branched |
| D 1107 | SIS (S:14/I:86) | linear |

S = styrene,
EB = ethylene butylene,
B = butadiene,
I = isoprene

Hexanediol diacrylate solvates all Kraton samples well except for G 1650, which shows partial miscibility. Photomer 4200 solvates D1102, D1107, D4141, D4240p, and G1657 at elevated temperatures. Photomer 4200 (an oligomeric diacrylate) solvates G 1652 partially. Polybutadiene dimethacrylate (Sartomer CN301) solvates D1116, D1102, and D4141 partially at elevated temperatures. Ebecryl 8402 solvates G 1657. Isodecyl acrylate is compatible with all of the above Kratons. Hexadecyl acrylate, lauryl acrylate, and stearyl acrylate solvate Kraton at elevated temperatures.

Other monomers that solvate Kraton include butyl acrylate, isooctyl acrylate, isobornyl acrylate, benzyl acrylate, tetrahydrofurfuryl acrylate, and vinyl benzoate. In general, aliphatic acrylates solvate rubbery Kraton well. Ethoxylated bisphenol A diacrylate (average molecular weight of 424) solvates Kraton D4240p, D1107, D4141, and D1102 only slightly.

Example 3

Styrene-Rich-SBS Systems

Kraton D1401P is a linear styrene-rich SBS tri-block copolymer. Reactive plasticizers that solvate Kraton D1401P include: vinyl benzoate; tetrahydrofurfuryl acrylate; benzyl acrylate and methacrylate; isobornyl acrylate and methacrylate; butyl acrylate; octyl acrylate; isodecyl acrylate; butanediol diacrylate; hexanediol diacrylate; and ethoxylated bisphenol A diacrylate and dimethacrylate.

To obtain thermodynamically compatible systems containing styrene-rich SBS tri-block copolymers, Kraton D1401P can be replaced by other SBS copolyrners such as those that are commercially available from Phillips Chemical Company (K-Resin), BASF (Styrolux), Fina Chemicals (Finaclear), and Asahi Chemical (Asaflex).

Example 4

Iso-refractive System

A preferred system exhibiting such material properties and embodying the process innovations described herein is given by SBS thermoplastic elastomers (K-Resin from Phillips, for example) that are blended with styrene-methylmethacrylate (SMMA) copolymers having a similar refractive index (NAS21 from Nova Chemicals, for example). The SMMA content may range from 0 wt % up to about 95 wt %. To achieve lower temperature mixing, the SMMA copolymer may be softened by the addition of 5–30 wt % of a reactive plasticizer (benzyl acrylate or methacrylate, for example). Once the SMMA-reactive plasticizer mixture is homogenized, it may be next blended with the SBS material at a lower overall temperature than that at which the two polymers could be blended by themselves. Alternatively, the polymers may be added to a single container along with the reactive plasticizer(s) and initiator and solvated at the same time by keeping the closed container in a slightly heated oven (about 60° C. for example) for several days. Once well-mixed (and regardless of the mixing process or scheme used), this mixture may be molded (optionally) or preferably compression molded such that the object experiences a pressure of up to 15,000 psi at a temperature of 100–110° C. The part may be rapidly cooled, then cured to lock in the phase morphology of the composite system. Alternatively, the part may be cured at the elevated temperature and pressure, then cooled at any convenient rate. The resulting article is an optically clear, impact resistant and morphologically stable object.

Example 5

Trapping of Molecular Orientation

Polystyrene is combined with a mixture of reactive plasticizers (benzyl acrylate and ethoxylated bisphenol-A diacrylate) in a ratio by weight of 85:10:5, respectively. A photoinitiator such as Irgacure 184 is also added at a concentration of 2 wt %. The components are allowed to sit in a closed container in an oven at 60° C. for a period of several days. The mixture is then homogenized in a twin-screw extruder operating at 120° C. The output film is drawn both in the direction of flow and horizontally, perpendicular to the direction of flow. After the drawing operation, the film possesses a biaxial molecular orientation of the polymer chains, which is then locked into place by running the film under a UV lamp to cure the material. The resultant film, having biaxially oriented polymer chains, possesses a beneficial morphology which is subsequently stabilized against future disruptions or alternations to the existing morphology.

Example 6

Phase Morphology Trapping

An SBS tri-block copolymer (Styrolux 684D from BASF Corporation) is combined with a mixture of reactive plasticizers (isobornyl methacrylate (Sartomer 423A), trimethylolpropane triacrylate (TMPTA-N from Radcure), and ethoxylated bisphenol-A diacrylate (Sartomer 349)) in a ratio by weight of 1.5:0.1:0.1:0.1, respectively. A photoinitiator such as Irgacure 184 is also added at a concentration of 2 wt %. The components are allowed to sit in a closed container in an oven at 60° C. for a period of several days. The mixture is then homogenized either in a twin-screw extruder device or by hand mixing at a temperature of approximately 150° C. If the mixture is subsequently allowed to cool to room temperature, then a slightly hazy material results whether or not the material is then cured. However, if the material is cured at the elevated temperature by exposing it to a source of polymerizing energy such as UV light, then the reactive plasticizers react to form a network that traps or locks in the existing transparent morphology. The resultant article may then be cooled to room temperature with no inducement of a hazy or cloudy morphology, producing a transparent object.

What is claimed is:

1. A cured resin comprising a semi-interpenetrating or interpenetrating crosslinked polymer network of reactive plasticizer within an entangled dead polymer, wherein said cured resin is optically transparent and has a desired morphology that is locked in place.

2. A cured resin according to claim 1 wherein said network of reactive plasticizer is further crosslinked to said dead polymer.

3. A cured resin according to claim 1 which is impact-resistant.

4. A cured resin comprising a semi-interpenetrating polymer network of reactive plasticizer within an entangled dead polymer, wherein said cured resin has a desired morphology that is locked in place and comprises two or more iso-refractive phases.

5. A cured resin comprising semi-interpenetrating or interpenetrating uncrosslinked reactive plasticizer polymeric chains within an entangled dead polymer, wherein said cured resin has a desired morphology that comprises two or more iso-refractive phases and is locked in place.

6. A cured resin comprising a semi-interpenetrating or interpenetrating crosslinked polymer network of reactive plasticizer within an entangled dead polymer, wherein said cured resin has a desired morphology that is locked in place and said dead polymer is selected from those polymers that are amorphous.

7. A cured resin comprising a semi-interpenetrating or interpenetrating crosslinked polymer network of reactive plasticizer within an entangled dead polymer, wherein said cured resin has a desired morphology that is locked in place and said dead polymer is a styrenic block copolymer.

8. A cured resin comprising a semi-interpenetrating or interpenetrating crosslinked polymer network of reactive plasticizer within an entangled dead polymer, wherein said cured resin has a desired morphology that is locked in place and said dead polymer is an amorphous thermoplastic elastomer.

9. A cured resin comprising a semi-interpenetrating or interpenetrating crosslinked polymer network of reactive plasticizer within an entangled dead polymer, wherein said cured resin has a desired morphology that is locked in place and said dead polymer is selected from the group consisting of polycarbonates, polystyrenes, poly(meth)acrylates, polysulfones, polyphenylene oxide, polyethylene terephthalate, polyolefins, thermoplastic elastomers, and variations, copolymers, and mixtures thereof.

10. A cured resin comprising a semi-interpenetrating or interpenetrating crosslinked polymer network of reactive plasticizer within an entangled dead polymer, wherein said cured resin has a desired morphology that is locked in place and said dead polymer is a polymer blend selected form the group consisting of mechanical blends, solvent-cast blends, graft-type blends, and block copolymers.

11. A cured resin comprising a semi-interpenetrating or interpenetrating crosslinked polymer network of reactive plasticizer polymer chains within an entangled dead polymer, wherein said cured resin has a desired morphology that is locked in place and said dead polymer is selected from those polymers that are amorphous.

12. A polymeric material prepared by:
    mixing together a dead polymer, a reactive plasticizer, and an initiator to form a polymerizable composition, wherein the polymerizable composition exhibits low shrinkage upon polymerization;
    processing said polymerizable composition to give a desired morphology of the polymeric constituents of said polymerizable composition;
    shaping said polymerizable composition into a desired geometry; and
    exposing said polymerizable composition to a source of polymerizing energy, to give a polymeric material wherein said desired morphology is locked in place.

13. A polymeric material according to claim 12 which further comprises the step of providing a waiting period at a predetermined temperature after said polymerizable composition is shaped and before exposing to said source of polymerizing energy.

14. A polymeric material according to claim 12 wherein said mixing step comprises a waiting period.

15. A polymeric material according to claim 12 wherein said desired morphology is a phase-separated morphology of said polymeric material.

16. A polymeric material according to claim 12 wherein said desired morphology is a molecular orientation of said polymeric material.

17. A polymeric material according to claim 12 wherein said desired morphology is an oriented phase-separated morphology of said polymeric material.

18. A polymeric material according to claim 12 wherein said desired morphology is a porosity of said polymeric material.

19. A polymeric material according to claim 12 wherein said desired morphology comprises two or more iso-refractive phases.

20. A polymeric material according to claim 12 wherein said reactive plasticizer forms polymeric chains having a higher glass transition temperature than that of the dead polymer.

21. A cured resin comprising semi-interpenetrating or interpenetrating crosslinked reactive plasticizer polymer chains within an entangled dead polymer, wherein said cured resin is optically transparent and has a desired morphology that is locked in place.

22. A cured resin according to claim 21 wherein said reactive plasticizer is crosslinked to said dead polymer.

23. A cured resin according to claim 21 which is impact-resistant.

24. A cured resin according to claim 21 which comprises two or more iso-refractive phases.

25. A cured resin according to claim 21, wherein said dead polymer is a styrenic block copolymer.

26. A cured resin according to claim 21, wherein said dead polymer is an amorphous thermoplastic elastomer.

27. A cured resin according to claim 21, wherein said dead polymer is selected from the group consisting of polycarbonates, polystyrenes, poly(meth)acrylates, polysulfones, polyphenylene oxide, polyethylene terephthalate, polyolefins, thermoplastic elastomers, and variations, copolymers, and mixtures thereof.

28. A cured resin according to claim 21, wherein said dead polymer is a polymer blend selected form the group consisting of mechanical blends, latex blends, solvent-cast blends, graft-type blends, and block copolymers.

29. A polymeric material according to claim 12 wherein said processing step and said shaping step are carried out by compressing said polymerizable composition in a mold, said mold corresponding to said desired geometry.

30. A polymeric material according to claim 12 wherein said dead polymer is a styrenic block copolymer.

31. A polymeric material according to claim 12 wherein said source of polymerizing energy is UV light and said desired morphology is locked in by rapid curing.

32. A cured resin according to claim 1 wherein said desired morphology is a phase-separated morphology of said polymeric material.

33. A cured resin according to claim 1 wherein said desired morphology is a molecular orientation of said polymeric material.

34. A cured resin according to claim 1 wherein said desired morphology is an oriented phase-separated morphology of said polymeric material.

35. A cured resin according to claim 1 wherein said reactive plasticizer forms polymeric chains having a higher glass transition temperature than that of the dead polymer.

36. A cured resin according to claim 1 wherein said desired morphology is a porosity of said polymeric material.

37. A cured resin according to claim 21 wherein said desired morphology is a phase-separated morphology of said polymeric material.

38. A cured resin according to claim 21 wherein said desired morphology is a molecular orientation of said polymeric material.

39. A cured resin according to claim 21 wherein said desired morphology is an oriented phase-separated morphology of said polymeric material.

40. A cured resin according to claim 21 wherein said reactive plasticizer forms polymeric chains having a higher glass transition temperature than that of the dead polymer.

41. A cured resin according to claim 21 wherein said desired morphology is a porosity of said polymeric material.

42. A cured resin according to claim 1 in which said desired morphology comprises two or more iso-refractive phases.

43. A cured resin according to claim 1 in which said dead polymer is amorphous.

44. A cured resin according to claim 1 in which said dead polymer is a styrenic block copolymer.

45. A cured resin according to claim 1 in which said dead polymer is an amorphous thermoplastic elastomer.

46. A cured resin according to claim 1 in which said dead polymer is selected from the group consisting of polycarbonates, polystyrenes, poly(meth)acrylates, polysulfones, polyphenylene oxide, polyethylene terephthalate, polyolefins, thermoplastic elastomers, and variations, copolymers, and mixtures thereof.

47. A cured resin according to claim 1 in which said dead polymer is a polymer blend selected form the group consisting of mechanical blends, solvent-cast blends, graft-type blends, and block copolymers.

48. An ophthalmic lens formed from a polymerizable composition comprising:
    an optically clear dead polymer selected from the group consisting of polycarbonates, polystyrenes, poly(meth)acrylates, polysulfones, polyphenylene oxide, polyethylene terephthalate, polyolefins, thermoplastic elastomers, and variations, copolymers, and mixtures thereof,
    a reactive plasticizer, and
    an initator,
wherein the polymerizable composition remains optically clear and exhibits low shrinkage upon polymerization and wherein the ophthalmic lens has a desired morphology that is locked in place.

49. An ophthalmic lens according to claim 48 which is impact-resistant.

50. An ophthalmic lens formed from a polymerizable composition comprising:

an optically clear dead polymer selected from the group consisting of mechanical blends, solvent-cast blends, graft-type blends, and block copolymers, a reactive plasticizer, and an initator, wherein the polymerizable composition remains optically clear and exhibits low shrinkage upon polymerization and wherein the ophthalmic lens has a desired morphology that is locked in place.

51. An ophthalmic lens according to claim 50 which is impact-resistant.

52. An ophthalmic lens formed from a polymerizable composition comprising an optically clear dead polymer, a reactive plasticizer, and an initiator, wherein the polymerizable composition remains optically clear and exhibits low shrinkage upon polymerization and wherein the ophthalmic lens has a morphology that is locked in place and that comprises two or more iso-refractive phases.

53. A method of preparing an opthalmic lens, the method comprising the steps of:

mixing together an optically clear dead polymer, a reactive plasticizer, and an initiator, for a period of time that includes a waiting period during which no agitation occurs, to form a polymerizable composition that exhibits low shrinkage upon polymerization;

processing said polymerizable composition to give a desired morphology of the polymeric constituents of said polymerizable composition;

placing said polymerizable composition into a mold while maintaining said desired morphology;

compressing the mold, with optional heating, so that the polymerizable composition takes on the shape of the internal cavity of the mold; and exposing said polymerizable composition to a source of polymerizing energy, to give an optically clear ophthalmic lens having a desired morphology that is locked in place.

54. A method of preparing an opthalmic lens, the method comprising the steps of:

mixing together an optically clear dead polymer, a reactive plasticizer, and an initiator, to form a polymerizable composition that exhibits low shrinkage upon polymerization;

processing said polymerizable composition to give a desired morphology of the polymeric constituents of said polymerizable composition;

placing said polymerizable composition into a mold while maintaining said desired morphology;

compressing the mold, with optional heating, so that the polymerizable composition takes on the shape of the internal cavity of the mold; and exposing said polymerizable composition to a source of polymerizing energy, to give an optically clear opthalmic lens having a morphology that is locked in place and that comprises two or more iso-refractive phases.

55. A method of preparing an ophthalmic lens, the method comprising the steps of:

mixing together an optically clear dead polymer, a reactive plasticizer, and an initiator, to form a polymerizable composition that exhibits low shrinkage upon polymerization;

processing said polymerizable composition to give a desired morphology of the polymeric constituents of said polymerizable composition;

placing said polymerizable composition into a mold while maintaining said desired morphology;

compressing the mold, with optional heating, so that the polymerizable composition takes on the shape of the internal cavity of the mold; and exposing said polymerizable composition to UV light to give an optically clear ophthalmic lens having a morphology that is locked in place by rapid curing.

* * * * *